(12) United States Patent
Takahashi

(10) Patent No.: US 8,738,827 B2  
(45) Date of Patent: May 27, 2014

(54) CIRCUITS AND METHODS FOR PROVIDING COMMUNICATION BETWEEN A MEMORY CARD AND A HOST DEVICE

(75) Inventor: Miki Takahashi, San Jose, CA (US)

(73) Assignee: O2Micro International Ltd., Georgetown (KY)

( * ) Notice: Subject to any disclaimer, the term of this patent is extended or adjusted under 35 U.S.C. 154(b) by 180 days.

(21) Appl. No.: 13/481,153

(22) Filed: May 25, 2012

(65) Prior Publication Data

US 2013/0024585 A1    Jan. 24, 2013

Related U.S. Application Data

(60) Provisional application No. 61/508,954, filed on Jul. 18, 2011.

(51) Int. Cl.
 *G06F 13/12* (2006.01)
 *G06F 13/38* (2006.01)

(52) U.S. Cl.
 USPC ............................................................ 710/74

(58) Field of Classification Search
 USPC ............................................................ 710/74
 See application file for complete search history.

(56) References Cited

U.S. PATENT DOCUMENTS 5,903,176 A * 5/1999 Westgate ...................... 327/295  
7,224,737 B2 * 5/2007 Voutilainen .................... 375/242

\* cited by examiner

*Primary Examiner* — Chun-Kuan Lee  
(74) *Attorney, Agent, or Firm* — Wang Law Firm, Inc.; Li K. Wang; Stephen Hsu

(57) ABSTRACT

An interface circuit provides communication between a memory card and a host device. The interface circuit includes first and second sets of pins and a control unit. The control unit enables the first set of pins and disables the second set of pins when transferring a first set of signals in a first mode via the first set of pins, and disables the first set of pins and enables the second set of pins when transferring a second set of signals in a second mode via the second set of pins. The control unit transfers a clock signal of the second set of signals by differential signaling in the second mode via a clock pin of the second set of pins. A signal transfer in the second mode is at a greater speed than a signal transfer in the first mode.

20 Claims, 3 Drawing Sheets

CIRCUITS AND METHODS FOR PROVIDING COMMUNICATION BETWEEN A MEMORY CARD AND A HOST DEVICE

This application is a non-provisional of U.S. provisional application 61/508954, filed on Jul. 18, 2011, the contents of which are incorporated by reference in their entirety.

BACKGROUND

FIG. 1 shows a conventional interface circuit 100 for a host device to communicate with a secure digital (SD) card in a legacy mode and an ultra high speed-II (UHS-II) mode alternatively. The interface circuit 100 includes a control unit 110 and an input/output (I/O) unit 120. The I/O unit 120 includes a UHS-II I/O unit 122, a legacy I/O unit 126 and a common I/O unit 124. The UHS-II I/O unit 122 together with the common I/O unit 124 transfers signals in the UHS-II mode, and the legacy I/O unit 126 together with the common I/O unit 124 transfers signals in the legacy mode.

The UHS-II I/O unit 122 includes pins P1-P4 coupled to a transfer circuit A, the legacy I/O unit 126 includes pins P7-P10 coupled to a transfer circuit C, and the common I/O unit 124 includes pins P5 and P6 coupled to a transfer circuit B. The transfer circuit B supports the legacy mode and the UHS-II mode. When in the UHS-II mode, the transfer circuit A and the transfer circuit B transfer signals via pins P1-P6. When in the legacy mode, the transfer circuit B and the transfer circuit C transfer signals via pins P5-P10. The control unit 110 controls the corresponding I/O units in the I/O unit 120 to transfer signals in the legacy mode or in the UHS-II mode.

More specifically, the transfer circuit B includes circuitry B1 operating in the UHS-II mode, circuitry B2 operating in both the legacy mode and the UHS-II mode, and circuitry B3 operating in the legacy mode. The control unit 110 generates signals A', B1'-B3' and C'. When in the UHS-II mode, the transfer circuit A and the circuitry B1 and B2 are enabled via signals A' and B1'-B2' respectively, and the circuitry B3 and the transfer circuit C are disabled via signals B3' and C' respectively. When in the legacy mode, the transfer circuit A and the circuitry B1 are disabled via signals A' and B1' respectively, and the circuitry B2 and B3 and the transfer circuit C are enabled via signals B2'-B3' and C' respectively.

Disadvantageously, since the common I/O unit 124 supports both the legacy mode and the UHS-II mode, complex control may be required. In other words, to enable and disable corresponding transfer circuits and circuitry in the I/O unit 120 according to the transfer mode, multiple signals such as signals A', B1'-B3' and C' are used. Therefore, it is to a simple and efficient circuit and method for transferring signals in either the UHS-II mode or the legacy mode the present invention is primarily directed.

SUMMARY

In one embodiment, the present invention provides an interface circuit that provides communication between a memory card and a host device. The interface circuit includes a first set of pins, a second set of pins and a control unit. The first and second sets of pins are connected to the interface circuit. The control unit, coupled to the first and second sets of pins, enables the first set of pins and disables the second set of pins when transferring a first set of signals between the host device and the memory card in a first mode via the first set of pins, and disables the first set of pins and enables the second set of pins when transferring a second set of signals between the host device and the memory card in a second mode via the second set of pins. The control unit transfers a clock signal of the second set of signals by differential signaling in the second mode via a clock pin of the second set of pins. A signal transfer in the second mode is at a greater speed than a signal transfer in the first mode.

In another embodiment, the present invention provides a system that includes a host device, a memory card and an interface circuit for providing communication between the host device and the memory card. The interface circuit includes a first unit, a second unit, and a control unit. The control unit receives a selection signal and adjusts signal transfer speed according to the selection signal by enabling the first unit and disabling the second unit to transfer a first signal between the host device and the memory card with a first signal transfer speed via the first unit, and by disabling the first unit and enabling the second unit to transfer a clock signal between the host device and the memory card via the second unit and to transfer a second signal between the host device and the memory card via the second unit with a second signal transfer speed. The control unit transfers the clock signal by differential signaling via the second unit.

In yet another embodiment, the present invention provides a method for providing communication between a host device and a memory card. The method includes enabling a first set of pins, disabling a second set of pins, and transferring a first set of signals via the first set of pins between the host device and the memory card, if a first mode is selected; and disabling the first set of pins, enabling the second set of pins, and transferring a second set of signals via the second set of pins between the host device and the memory card, if a second mode is selected. The transferring of the second set of signals includes transferring a clock signal of the second set of signals via a clock pin of the second set of pins by differential signaling in the second mode. A signal transfer speed of the second mode is greater than a signal transfer speed of the first mode.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Reference will now be made in detail to the embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The present invention enables a host device to adaptively transfer signals from/to memory cards using different transfer standards and with different signal transfer speeds. The present invention also enables a memory card to adaptively transfer signals from/to different host devices using different transfer standards and with different signal transfer speeds.

Figure 1:
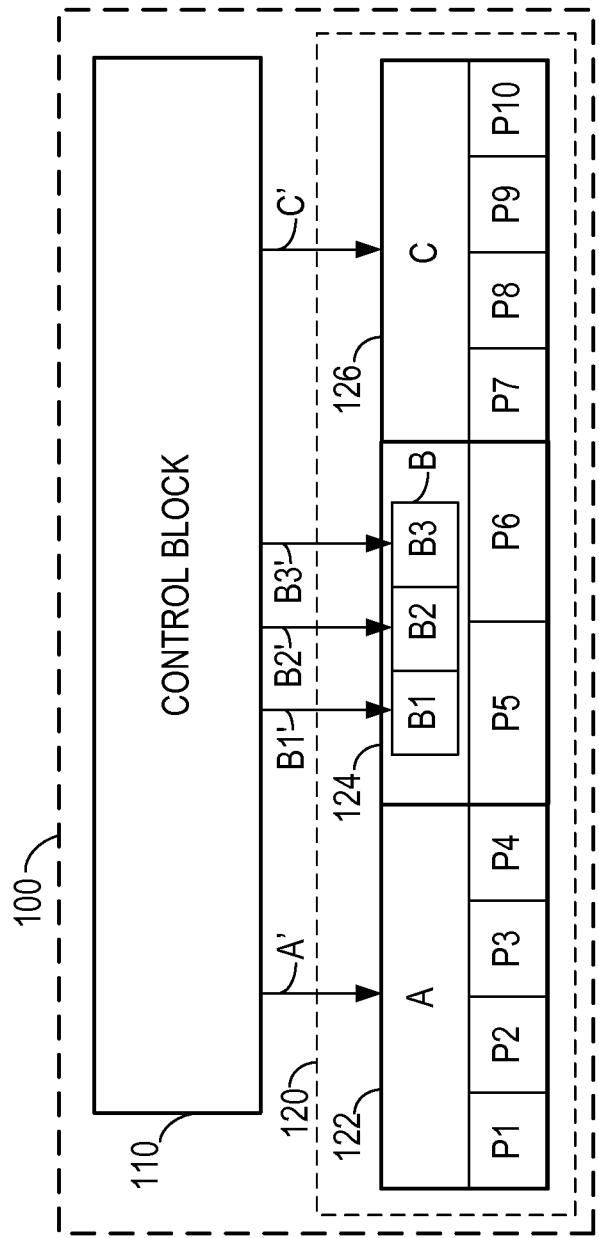
FIG. 1 shows a conventional interface circuit for providing communication between a host device and an SD card.
Figure 2:
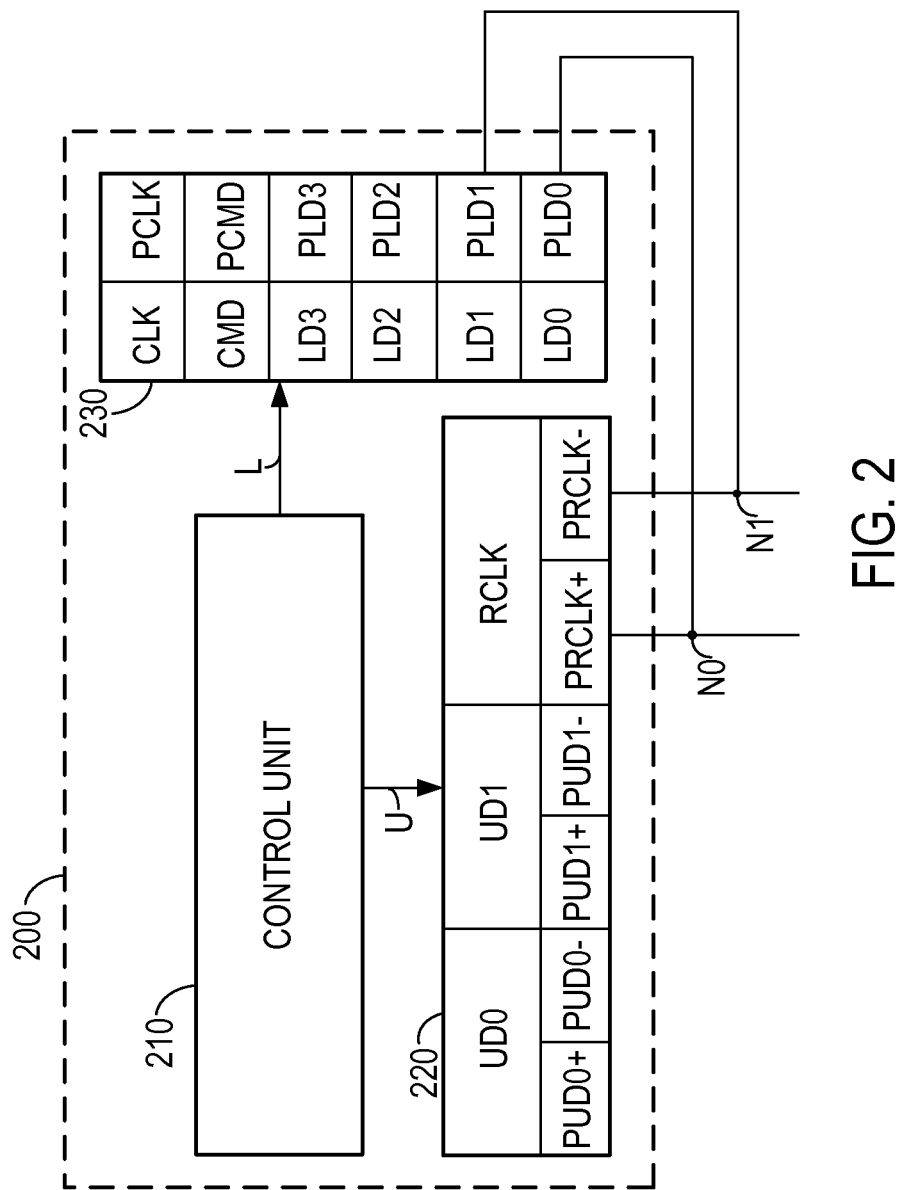
FIG. 2 illustrates an example of an interface circuit for providing communication between a memory card and a host device, in accordance with one embodiment of the present invention.

FIG. 2 illustrates an example of an interface circuit 200 for providing communication between a host device and a memory card, in accordance with one embodiment of the present invention. The host device can be, but is not limited to, an electronic device capable of reading data from or writing data to the memory card. By way of example, the electronic device may be a memory card controller chip, a memory card reader, or a digital camcorder. The memory card may be, but is not limited to, a secure digital (SD) card. The interface circuit 200 transfers signals between a memory card and a host device. In one embodiment, the interface circuit 200 is included in a host device. Alternatively, in another embodiment, the interface circuit 200 is included in an SD card.

The interface circuit 200 supports multiple transfer modes. The multiple transfer modes include, but are not limited to, a legacy mode, e.g., a high speed (HS) mode or ultra high speed-I (UHS-I) mode, and an advanced mode, e.g., an ultra high speed-II (UHS-II) mode. The signal transfer in the advanced mode is at a greater speed than the signal transfer in the legacy mode. The signal transferred in the multiple transfer modes includes, but is not limited to, a data signal, a command signal, or a clock signal. In one embodiment, the data transfer in the advanced mode is at a greater speed than the data transfer in the legacy mode.

In one embodiment, the host device detects the type of the memory card, and selects a transfer mode among the multiple transfer modes according to a detection result. If the detection result indicates the memory card supports only one mode, and the host device supports the same mode, the host device selects the mode supported by the memory card. If the detection result indicates the memory card supports multiple modes, and the host device supports only one mode among the multiple modes supported by the memory card, the host device selects the mode supported by the host device. If both the memory card and the host device support multiple modes, the host device selects a mode supported by both the memory card and the host device and with a greater speed of signal transfer.

In the example of FIG. 2, the interface circuit 200 includes a first input/output (I/O) unit 230 for transferring signals in a first mode and a second I/O unit 220 for transferring signals in a second mode, e.g., a legacy I/O unit 230 for transferring signals in the legacy mode and a UHS-II I/O unit 220 for transferring signals in the UHS-II mode. The interface circuit 200 further includes a control unit 210 for receiving a selection signal from the host device. The selection signal is determined according to a transfer mode supported by both the host device and the memory card, and indicates the mode selected among the multiple transfer modes. The control unit 210 controls the legacy I/O unit 230 and the UHS-II I/O unit 220 for the purpose of transferring signals. For example, if the legacy mode is selected, the control unit 210 enables the legacy I/O unit 230 via a signal L and disables the UHS-II I/O unit 220 via a signal U, and if the UHS-II mode is selected, the control unit 210 disables the legacy I/O unit 230 via the signal L and enables the UHS-II I/O unit 220 via the signal U. In other words, the control unit 210 enables either the legacy I/O unit 230 or the UHS-II I/O unit 220 according to the selection signal.

In the example of FIG. 2, a set of I/O pins for the UHS-II I/O unit 220 connect to a set of transfer circuits in the interface circuit 200, e.g., I/O pins PUD0+ and PUD0− connect to a transfer circuit UD0, I/O pins PUD1+ and PUD1− connect to a transfer circuit UD1, and I/O pins PRCLK+ and PRCLK− connect to a transfer circuit RCLK, respectively. In one embodiment, the I/O pins PUD0+ and PUD0−, PUD1+ and PUD1−, and PRCLK+ and PRCLK− and the transfer circuits UD0, UD1, and RCLK are integrated into the interface circuit 200. Here the term "I/O pin" in the present disclosure means a pin performing input function, or a pin performing output function, or a pin performing input and output function.

In the UHS-II mode, the interface circuit 200 transfers a set of signals via the I/O pins PUD0+ and PUD0−, PUD1+ and PUD1−, and PRCLK+ and PRCLK−. More specifically, in the UHS-II mode, the control unit 210 controls the transfer circuits UD0 and UD1 to transfer signals via the I/O pins PUD0+ and PUD0− and I/O pins PUD1+ and PUD1− respectively. In one embodiment, the transfer circuit UD0 transfers signals from the host device to the SD card via the I/O pins PUD0+ and PUD0−, and the transfer circuit UD1 transfers signals from the SD card to the host device via the I/O pins PUD1+ and PUD1−. In an alternate embodiment, the transfer circuits UD1 transfers signals from the host device to the SD card via the I/O pins PUD1+ and PUD1−, and the transfer circuit UD0 transfers signals from the SD card to the host device via the I/O pins PUD0+ and PUD0−.

In the UHS-II mode, the control unit 210 controls the transfer circuit RCLK to transfer clock signals via the I/O pins PRCLK+ and PRCLK− between the host device and the SD card, e.g., from the host device to the SD card. In one embodiment, the frequencies of the clock signals transferred by the transfer circuit RCLK are less than the frequencies of the signals transferred by the transfer circuits UD0 and UD1. In one embodiment, the transfer circuits UD0, UD1 and RCLK transfer signals by differential signaling. For example, the transfer circuit RCLK transfer complementary signals via pins PRCLK+ and PRCLK−.

In the example of FIG. 2, a set of I/O pins for the legacy I/O unit 230 connect to a set of transfer circuits in the interface circuit 200, e.g., I/O pins PLD0-PLD3 connect to transfer circuits LD0-LD3 respectively, an I/O pin PCMD connects to a transfer circuit CMD, and an I/O pin PCLK connects to a transfer circuit CLK. In one embodiment, the I/O pins PLD0-PLD3, PCMD and PCLK and the transfer circuits LD0-LD3, CMD and CLK are integrated into the interface circuit 200.

In the legacy mode, the interface circuit 200 transfers a set of signals via the I/O pins PLD0-PLD3, PCMD and PCLK. More specifically, in the legacy mode, the control unit 210 controls the transfer circuits LD0-LD3 to transfer signals via the I/O pins PLD0-PLD3, controls the transfer circuit CMD to transfer a command signal via the I/O pin PCMD, and controls the transfer circuit CLK to transfer a clock signal via the I/O pin PCLK, between the SD card and the host device. In one embodiment, the command signal indicates the direction of the signal transfer done by the transfer circuits LD0-LD3, e.g., from the SD card to the host device or from the host device to the SD card. In one embodiment, the frequency of the clock signal transferred via the I/O pin PCLK is equal to the frequency of the signals transferred via the I/O pins PLD0-PLD3.

In other words, the control unit 210 receives the selection signal and adjusts signal transfer speed according to the selection signal. More specifically, the control unit 210 enables the pins PLD0-PLD3, PCMD and PCLK and disables the pins PUD0+ and PUD0−, PUD1+ and PUD1−, and PRCLK+ and PRCLK− to transfer signals between the host device and the SD card in the legacy mode via the pins PLD0-PLD3, PCMD and PCLK. The pins PLD0-PLD3 transfer data with a first signal transfer speed of the legacy mode. The interface circuit 200 disables the pins PLD0-PLD3, PCMD and PCLK and enables the pins PUD0+ and PUD0−, PUD1+ and PUD1−, and PRCLK+ and PRCLK− to transfer signals between the host device and the SD card in the UHS-II mode via the pins PUD0+ and PUD0−, PUD1+ and PUD1−, and PRCLK+ and PRCLK−. The pins PUD0+/− and PUD1+/− transfer data with a second signal transfer speed of the UHS-II mode. The second signal transfer speed of the UHS-II mode is greater than the first signal transfer speed of the legacy mode.

In the example of FIG. 2, the pin PRCLK+ of the UHS-II I/O unit 220 and the pin PLD0 of the legacy I/O unit 230 are coupled to a common node N0, and the pin PRCLK− of the UHS-II I/O unit 220 and the pin PLD1 of the legacy I/O unit 230 are coupled to a common node N1. The signals transferred from/to the I/O pins coupled to the nodes are transferred via the nodes, e.g., the signals transferred from/to the I/O pins PRCLK+ and PLD0 are transferred via the node N0. In other words, in one embodiment, in the UHS-II mode, the interface circuit 200 transfers a first clock signal between a first communication circuit and the pin PRCLK+ via the node N0, and transfers a second clock signal between the first communication circuit and the pin PRCLK− via the node N1. In the legacy mode, the interface circuit 200 transfers a first data signal between a second communication circuit and the pin PLD0 via the node N0, and transfers a second data signal between the second communication circuit and the pin PLD1 via the node N1. The first and second communication circuits can be either the host devices or the SD cards. For example, if the interface circuit is included in the host device, the first and second communication circuits are SD cards. If the interface circuit is included in the SD card, the first and second communication circuits are host devices. In one embodiment, the control unit 210, the UHS-II I/O unit 220, and the legacy I/O unit 230 are integrated into a chip.

Advantageously, the legacy I/O unit 230 for transferring signals in the legacy mode and the UHS-II I/O unit 220 for transferring signals in the UHS-II mode can be independent, therefore less complex control can be adopted. More specifically, by applying fewer signals, such as the signals L and U, the corresponding unit can be enabled or disabled according to the transfer mode selected, and the interface circuit 200 can then transfer signals in the transfer mode selected.

The interface circuit 200 can be used in various applications such as digital camcorders, digital cameras, televisions, set top boxes, personal computers, mobile phones, SD cards, and SD card readers.

Figure 3:
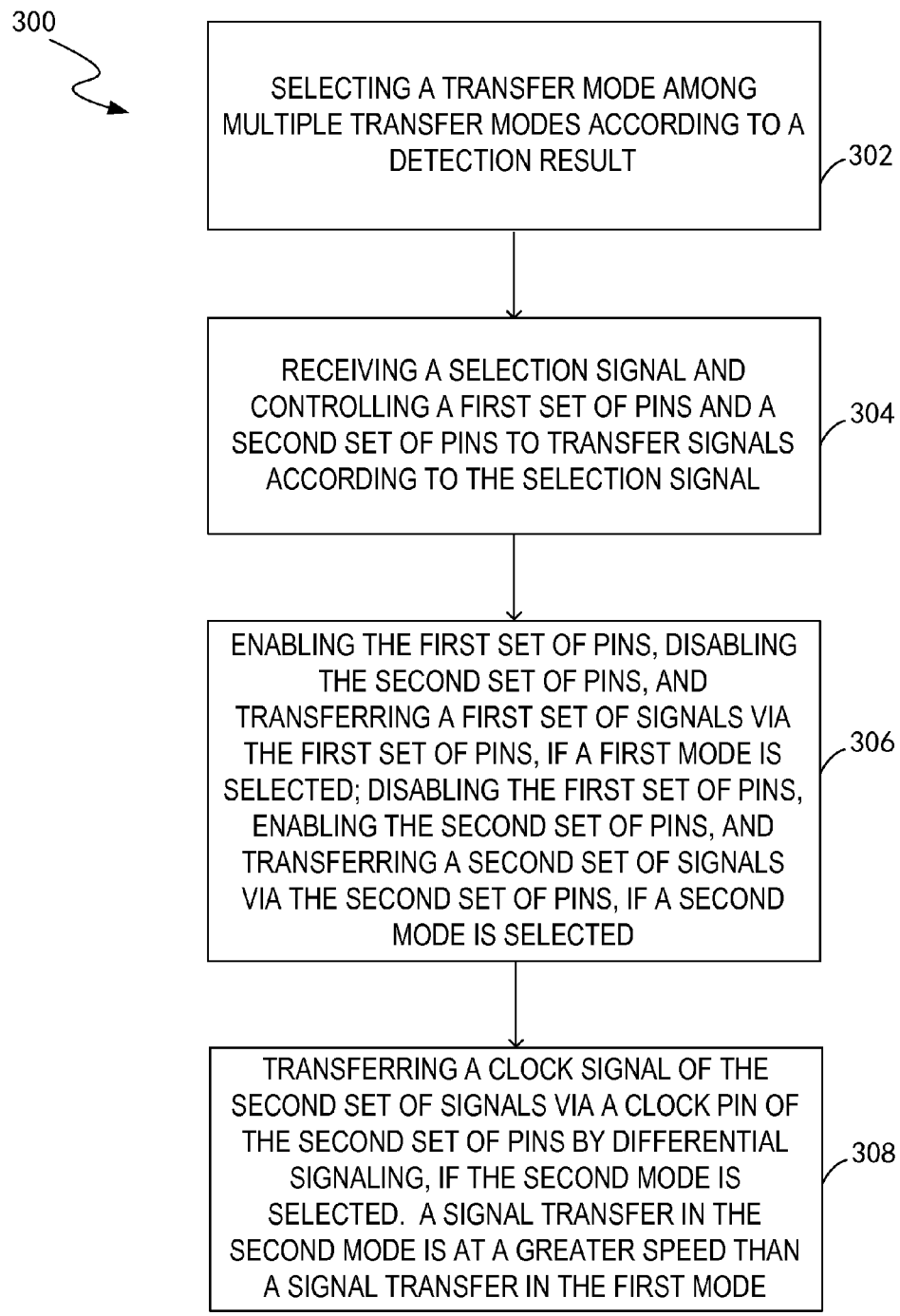
FIG. 3 shows a flowchart of an example of a method for providing communication between a memory card and a host device, in accordance with one embodiment of the present invention.

FIG. 3 illustrates a flowchart of a method 300 for providing communication between a memory card (e.g., an SD card) and a host device. FIG. 3 is described in combination with FIG. 2. Although specific steps are disclosed in FIG. 3, such steps are examples. That is, the present invention is well suited to perform various other steps or variations of the steps recited in FIG. 3.

At step 302, the host device, e.g., a digital camcorder, detects the type of the memory card, and selects a transfer mode for communication between the memory card and the host device among multiple transfer modes such as a first mode and a second mode, according to a detection result. For example, if the detection result shows the memory card supports only one mode, and the host device supports the same mode, the host device selects the mode supported by the memory card. If the detection result shows the memory card supports multiple modes, and the host device supports only one mode among the multiple modes, the host device selects the mode supported by the host device. If both the memory card and the host device support multiple modes, the host device selects a mode supported by both the memory card and the host device and with a greater signal transfer speed. In one embodiment, the signal transfer in the second mode is at a greater speed than the signal transfer in the first mode. The signal transferred in the multiple transfer modes includes, but is not limited to, a data signal, a command signal, or a clock signal. In one embodiment, the data transfer in the second mode is at a greater speed than the data transfer in the first mode.

At step 304, a control unit receives a selection signal from the host device, and controls a first unit or a second unit to transfer signals according to the selection signal. The selection signal indicates a mode selected from the first mode and the second mode. For example, if a legacy mode is selected, a control unit 210 enables a legacy I/O unit 230 via a signal L and disables a UHS-II I/O unit 220 via a signal U, and if a UHS-II mode is selected, the control unit 210 disables the legacy I/O unit 230 via the signal L and enables the UHS-II I/O unit 220 via the signal U.

More specifically, the control unit 210 controls a first set of pins or a second set of pins to transfer signals according to the selection signal. The legacy I/O unit 230 includes a first set of pins PLD0-PLD3, PCMD and PCLK, and the UHS-II I/O unit 220 includes a second set of pins PUD0+ and PUD0−, PUD1+ and PUD1−, and PRCLK+ and PRCLK−.

At step 306, if the legacy mode is selected, the control unit 210 enables the first set of pins and disables the second set of pins. The legacy I/O unit 230 transfers a first set of signals via the first set of pins. If the UHS-II mode is selected, the control unit 210 disables the first set of pins and enables the second set of pins. The UHS-II I/O unit 220 transfers a second set of signals via the second set of pins. At step 308, if the UHS-II mode is selected, the UHS-II I/O unit 220 transfers a clock signal of the second set of signals via a clock pin of the second set of pins by differential signaling. For example, the UHS-II I/O unit 220 transfers clock signals via pins PRCLK+ and PRCLK− by differential signaling.

In one embodiment, a first pin of the first set of pins is coupled to the clock pin via a node. For example, pins PLD0 and PLD1 are coupled to the pins PRCLK+ and PRCLK− via nodes N0 and N1, respectively.

In the first mode, the first unit transfers a first signal of the first set of signals between the first pin and a first communication circuit via the node, and in the second mode, the second unit transfers the clock signal between the clock pin and a second communication circuit via the node. By way of example, in the legacy mode, the legacy I/O unit 230 transfers a data signal between the pin PLD0 and a first communication circuit via the node N0, and transfers a data signal between the pin PLD1 and the first communication circuit via the node N1. In the UHS-II mode, the UHS-II I/O unit 220 transfers a first clock signal between the pin PRCLK+ and a second communication circuit via the node N0, and transfers a second clock signal between the pin PRCLK− and the second communication circuit via the node N1.

In one embodiment, the first set of signals includes a command signal. The command signal indicates the direction of the transfer of a data signal of the first set of signals, e.g., from the SD card to the host device or from the host device to the SD card. In one embodiment, the frequency of a clock signal of the first set of signals is equal to the frequency of a data signal of the first set of signals.

In one embodiment, the UHS-II I/O unit 220 transfers data signals of the second set of signals from the SD card to the host device via the pins PUD1+/−, and transfers data signals of the second set of signals from the host device to the SD card via the pins PUD0+/−. In an alternative embodiment, the UHS-II I/O unit 220 transfers the data signals from the host device to the SD card via the pins PUD1+/−, and transfers the data signals from the SD card to the host device via the pins PUD0+/−. In one embodiment, the frequencies of the clock signals transferred via the pins PRCLK+/− are less than the frequencies of the data signals transferred via the pins PUD0+/− and PUD1+/−.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An interface circuit for providing communication between a memory card and a host device, comprising:
   a first plurality of pins connected to the interface circuit;
   a second plurality of pins connected to the interface circuit; and
   a control unit, coupled to the first and second pluralities of pins, that enables the first plurality of pins and disables the second plurality of pins when transferring a first plurality of signals between the host device and the memory card in a first mode via the first plurality of pins, and that disables the first plurality of pins and enables the second plurality of pins when transferring a second plurality of signals between the host device and the memory card in a second mode via the second plurality of pins,
   wherein the control unit transfers a clock signal of the second plurality of signals by differential signaling in the second mode via a clock pin of the second plurality of pins, and wherein a signal transfer in the second mode is at a greater speed than a signal transfer in the first mode.

2. The interface circuit of claim 1, wherein a first pin in the first plurality of pins is coupled to the clock pin via a node, wherein the interface circuit transfers a first signal of the first plurality of signals between the first pin and a first communication circuit via the node in the first mode, and transfers the clock signal between the clock pin and a second communication circuit via the node in the second mode.

3. The interface circuit of claim 2, wherein the first signal comprises a data signal, and wherein the first plurality of signals comprises a command signal indicative of the direction of transfer of the first signal.

4. The interface circuit of claim 1, wherein the second mode comprises an ultra high speed-II mode.

5. The interface circuit of claim 1, wherein the host device comprises a digital camcorder.

6. The interface circuit of claim 1, wherein the memory card comprises a secure digital card.

7. The interface circuit of claim 1, wherein the interface circuit is included in the host device.

8. The interface circuit of claim 1, wherein the control unit further receives a selection signal indicative of a mode selected from the first mode and the second mode, and selectively enables the first plurality of pins and the second plurality of pins according to the selection signal.

9. The interface circuit of claim 8, wherein the selection signal is determined according to a transfer mode supported by both the host device and the memory card.

10. A system comprising:
    a host device;
    a memory card; and
    an interface circuit for providing communication between the host device and the memory card, the interface circuit comprising:
    a first unit;
    a second unit; and
    a control unit that receives a selection signal and adjusts signal transfer speed according to the selection signal by enabling the first unit and disabling the second unit to transfer a first signal between the host device and the memory card with a first signal transfer speed via the first unit, and by disabling the first unit and enabling the second unit to transfer a clock signal between the host device and the memory card via the second unit and to transfer a second signal between the host device and the memory card with a second signal transfer speed via the second unit,
    wherein the control unit transfers the clock signal by differential signaling via the second unit.

11. The system of claim 10, wherein the first unit comprises a first pin and the second unit comprises a clock pin, wherein the first pin is coupled to the clock pin via a node, wherein the interface circuit transfers the first signal between the first pin and a first communication circuit via the node, and transfers the clock signal between the clock pin and a second communication circuit via the node.

12. The system of claim 10, wherein the first signal and the second signal comprise data signals.

13. The system of claim 10, wherein the second mode comprises an ultra high speed-II mode.

14. The system of claim 10, wherein the host device comprises a digital camcorder.

15. The system of claim 10, wherein the interface circuit is included in the host device.

16. A method for providing communication between a host device and a memory card, comprising:
    enabling a first plurality of pins, disabling a second plurality of pins;
    transferring a first plurality of signals via the first plurality of pins between the host device and the memory card, if a first mode is selected;
    disabling the first plurality of pins;
    enabling the second plurality of pins; and
    transferring a second plurality of signals via the second plurality of pins between the host device and the memory card, if a second mode is selected,
    wherein the transferring of the second plurality of signals comprises transferring a clock signal of the second plurality of signals via a clock pin of the second plurality of pins by differential signaling in the second mode, and wherein a signal transfer in the second mode is at a greater speed than a signal transfer in the first mode.

17. The method of claim 16, further comprising:
receiving a selection signal indicative of a mode selected from the first mode and the second mode.

18. The method of claim 16, wherein a first pin of the first plurality of pins is coupled to the clock pin via a node, wherein the transferring of the first plurality of signals comprises transferring a first signal of the first plurality of signals between the first pin and a first communication circuit via the node in the first mode, and wherein the transferring of the second plurality of signals comprises transferring the clock signal between the clock pin and a second communication circuit via the node in the second mode.

19. The method of claim 16, wherein the host device comprises a digital camcorder.

20. The method of claim 16, wherein the second mode comprises an ultra high speed-II mode.

* * * * *